US012339032B2

(12) United States Patent
Mann et al.

(10) Patent No.: US 12,339,032 B2
(45) Date of Patent: Jun. 24, 2025

(54) ACOUSTIC DAMPENING AIR MOVING DEVICE HOUSING

(71) Applicant: INTERNATIONAL BUSINESS MACHINES CORPORATION, Armonk, NY (US)

(72) Inventors: Phillip V. Mann, Rochester, MN (US); Tyler Jandt, Austin, TX (US); Sandra J. Shirk/Heath, Rochester, MN (US); Tyler Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 17/805,266

(22) Filed: Jun. 3, 2022

(65) Prior Publication Data

US 2023/0392822 A1 Dec. 7, 2023

(51) Int. Cl.
*F24F 13/24* (2006.01)
*G10K 11/162* (2006.01)
*G10K 11/178* (2006.01)

(52) U.S. Cl.
CPC ............ *F24F 13/24* (2013.01); *G10K 11/162* (2013.01); *G10K 11/178* (2013.01); *F24F 2013/242* (2013.01); *G10K 2210/121* (2013.01)

(58) Field of Classification Search
CPC ................. F24F 13/24; F24F 2013/242; F24F 2013/247; G10K 11/162; G10K 11/178;
(Continued)

(56) References Cited

U.S. PATENT DOCUMENTS 3,174,682 A * 3/1965 Wilfert .................. F04D 25/082 415/200
3,692,141 A * 9/1972 Labussiere ............ F04D 29/664 137/15.1
(Continued)

FOREIGN PATENT DOCUMENTS

CN 105757955 A * 7/2016 ............. F24F 13/24
CN 107725487 A 2/2018
(Continued)

OTHER PUBLICATIONS

English translation of CN-105757955-A, dated Aug. 22, 2024 (Year: 2024).*
English translation of CN-110567069-A, dated Aug. 22, 2024 (Year: 2024).*
English translation of CN-111379724-B, dated Mar. 13, 2025 (Year: 2025).*
(Continued)

*Primary Examiner* — Michael G Hoang
*Assistant Examiner* — Brett Peterson Mallon
(74) *Attorney, Agent, or Firm* — Matthew Zehrer

(57) ABSTRACT

An air moving device (AMD) includes a housing that dampens noise and routes airflow. The AMD housing includes a focal-bearing surface that has an associated focal point. The focal-bearing surface routes airflow through the AMD housing and reflects and concentrates noise to the focal point. The AMD housing further includes a noise dampening structure at the focal point to reduce, absorb, and/or dampen the concentrated noise. Because the noise is concentrated, a relatively smaller size noise dampening structure may effectively or adequately reduce or dampen AMD noise. The smaller size noise dampening structure relatively reduces airflow impedance. As such, AMD housing may provide for both reduced AMD noise and relatively reduced airflow impedance therein and/or therefrom.

20 Claims, 5 Drawing Sheets

(58) Field of Classification Search
CPC ............ G10K 2210/121; G10K 11/161; F04D 29/664; F02C 7/045; F02K 1/827
See application file for complete search history.

(56) References Cited

U.S. PATENT DOCUMENTS

| | | | | |
|---|---|---|---|---|
| 4,667,768 | A | 5/1987 | Wirt | |
| 5,732,547 | A * | 3/1998 | Olsen | G10K 11/17861 415/119 |
| 6,536,556 | B2 | 3/2003 | Porte | |
| 7,055,648 | B2 | 6/2006 | Byrne | |
| 7,578,468 | B2 | 8/2009 | Drost | |
| 8,127,889 | B1 | 3/2012 | Mathur | |
| 2020/0291964 | A1 * | 9/2020 | Goto | F02C 9/00 |
| 2021/0373624 | A1 | 12/2021 | Schnell | |
| 2021/0401247 | A1 | 12/2021 | Iwakami | |

FOREIGN PATENT DOCUMENTS

| | | | | |
|---|---|---|---|---|
| CN | 110567069 | A * | 12/2019 | |
| CN | 111379724 | B * | 4/2022 | F04D 25/166 |
| JP | 62277044 | A | 12/1987 | |
| WO | 2000020748 | A3 | 4/2000 | |

OTHER PUBLICATIONS

International Search Report and Written Opinion dated Aug. 25, 2023, for International Application No. PCT/EP2023/062218, filed May 9, 2023.

Gorji-Bandpy, et al., "Technologies for jet noise reduction in turbofan engines." Published Mar. 2012. 8 pages. In Aviation 16(1):25-32. Published by Research Gate. DOI: 10.3846/16487788.2012.679770.

* cited by examiner

ACOUSTIC DAMPENING AIR MOVING DEVICE HOUSING

BACKGROUND

Various embodiments of the present application generally relate to cooling an electronic system with an active air moving device (AMD).

Electronic system components, such a processing chips (PCs), memory, or the like, generate heat during operation. Heat may be transferred away from these components to maintain adequate operating temperatures by one or more active AMDs, such as fans.

As a byproduct of moving air, AMDs also generate noise. The noise mostly results from pushed air leaving the fan with a little noise generated from new air sucked in to replace it. Noise from the exiting air comes from eddy swirls following the trailing edge of the rotating blade. More noise is generated by an outward pulse of air as the leading edge of each blade pushes forward cutting the air.

The trailing eddies produce a broad spectrum of random noise, modulated by the fan blade revolutions per minute, or a full cycle of the blade rotation per time, though AMDs may generate acoustic noise at frequencies lower than the blade frequency. The outward pulses occur at the blade frequency and include harmonics. Noise generation is stronger near the tip of the blade, as this part of the blade has a higher relative velocity. Faster splitting of the air results in a sharper leading edge of the pressure pulse. Therefore, higher frequency noise is concentrated at the blade tips.

Noise from a fan will show variations from the fan blade frequency because one blade is not perfectly identical with respect to another within the fan. Further, the eddy swirls are not the same each time a blade passes by. The eddy swirls are typically random and the variations from one rotation cycle to the next lead to generation of sub-harmonic noise.

SUMMARY

In an embodiment of the present invention, an air moving device is presented. The air moving device includes a housing that includes an airflow inlet, an airflow outlet, and a downstream focal-bearing surface. The air moving device further includes a fan system that includes a fan that rotates about an axis of rotation. The fan system impinges an airflow in a first direction against the downstream focal-bearing surface and emits noise. The downstream focal-bearing surface redirects the airflow in a second direction toward the airflow outlet. The air moving device further includes a first noise dampening structure at a focal point of the downstream focal-bearing surface. The downstream focal-bearing surface redirects and concentrates the noise at the focal point of the downstream focal-bearing surface. The first noise dampening structure reduces the concentrated noise.

In another embodiment of the present invention, an air moving device method is presented. The method includes emitting, with a fan system, an airflow in a first direction against a downstream focal-bearing surface. The method further includes redirecting, with the downstream focal-bearing surface, the airflow in a second direction toward an airflow outlet. The air moving device further includes concentrating, with the downstream focal-bearing surface, noise emitted from the fan system at a focal point of the downstream focal-bearing surface. The air moving device further includes reducing the concentrated noise, with a first noise dampening structure, at the focal point of the downstream focal-bearing surface.

These and other embodiments, features, aspects, and advantages will become better understood with reference to the following description, appended claims, and accompanying drawings.

Figure 1:
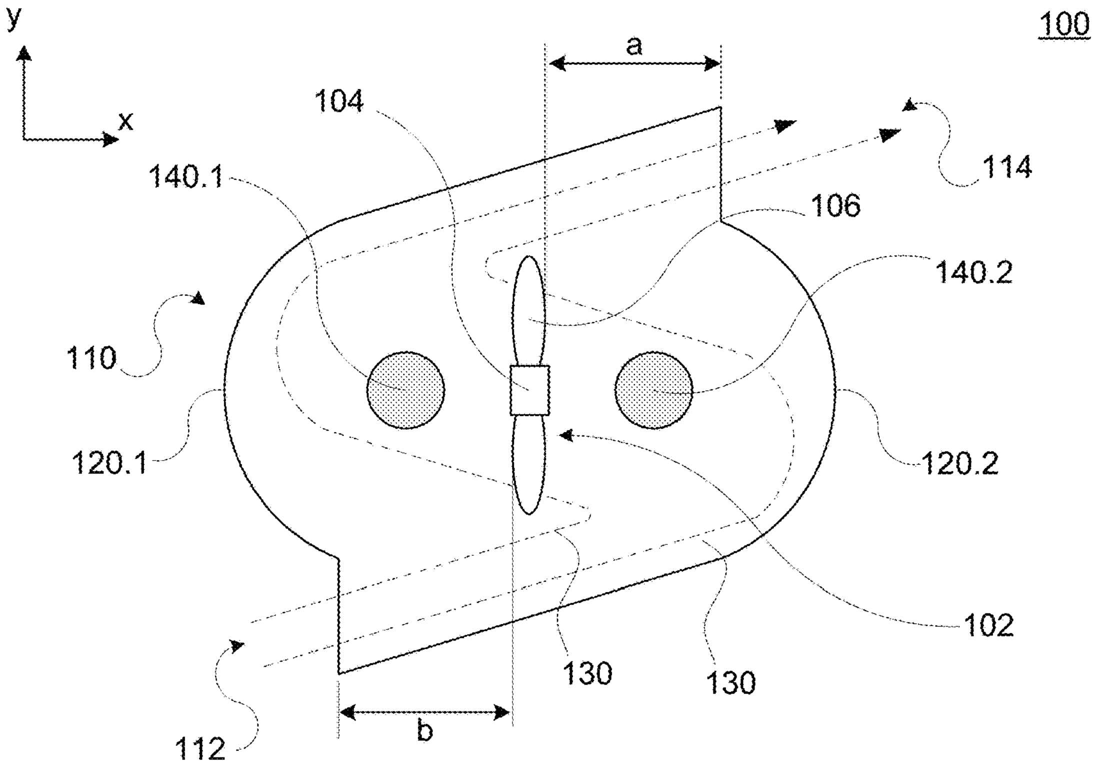
FIG. 1, FIG. 2, and FIG. 3 each depict a cross-section view of an AMD housing that routes airflow and that dampens acoustic noise, according to one or more embodiments of the present invention.

In accordance with common practice, the various features illustrated in the drawings may not be drawn to scale. Accordingly, the dimensions of the various features may be arbitrarily expanded or reduced for clarity. In addition, some of the drawings may not depict all the components of a given system, method, or device. Finally, like reference numerals may be used to denote like features throughout the specification and Figures.

DETAILED DESCRIPTION

One of the most practical techniques to increase the amount of heat transfer away from electronic system components is to increase blade frequency of the AMD utilized to cool such device. However, an increase in blade frequency will inherently increase the acoustic noise emitted from the AMD. Because of the inherent tradeoffs between airflow and noise generation, there are needs for AMD solutions that output high airflow along with low or reduced acoustic noise.

Known solutions for reducing AMD related noise utilize high airflow impedance materials at the electronic system level. Such system level solutions may result in modest improvements in noise reduction and often drastically reduce the airflow through the system. Another known solution optimizes fan blade geometry to reduce noise. However, such blades may not reduce noise to a sufficient degree at blade frequencies needed in modern and future electronic systems.

The embodiments herein relate to an AMD housing that dampens noise while also routes airflow. The AMD housing includes a focal-bearing surface that has an associated focal point. The focal-bearing surface routes airflow and reflects and concentrates noise to the focal point. The AMD housing further includes a noise dampening structure at the focal point to reduce, absorb, and/or dampen the concentrated noise. Because noise is concentrated within the AMD housing, a relatively smaller size noise dampening structure may effectively or adequately reduce or dampen the noise generated by the AMD. The smaller size noise dampening structure provides for relatively reduced airflow impedance. As such, the embodiments may provide for both reduced AMD noise and relatively reduced airflow impedance therein and/or therefrom.

Figure 2:
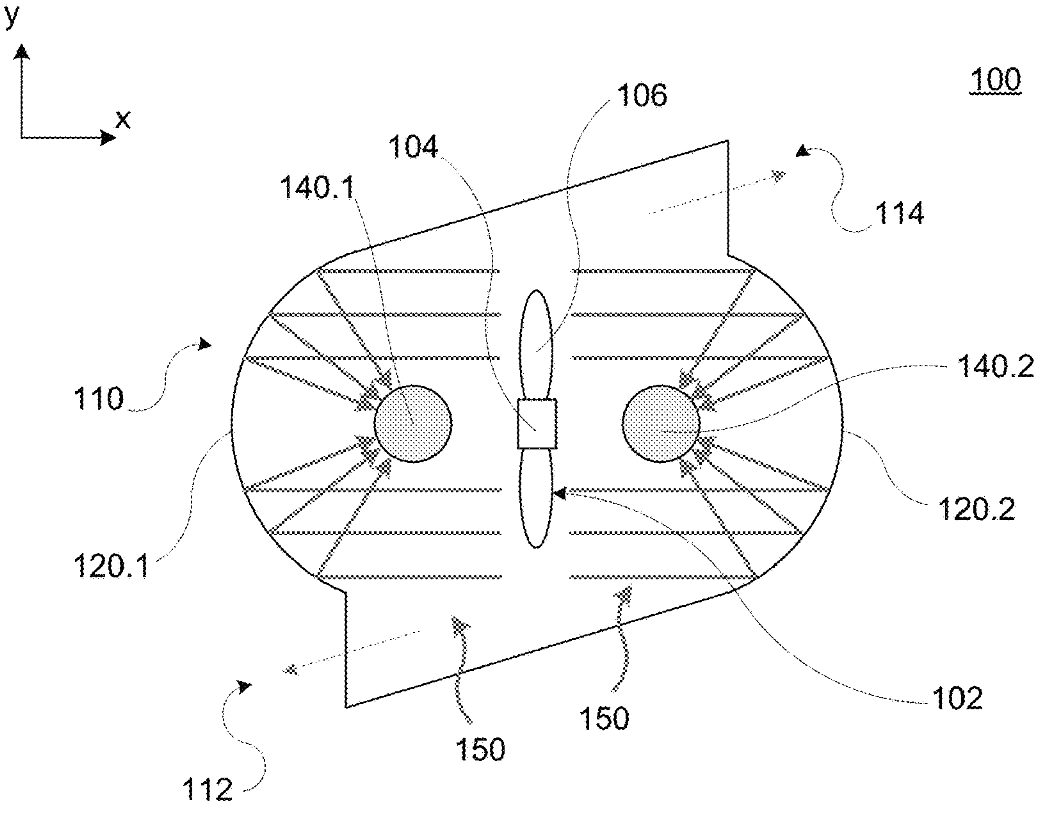

FIG. 1 depicts a x-y planar cross-section view AMD 100 that includes an AMD housing 110 that routes airflow 130 and that dampens acoustic noise 150, exemplarily depicted in FIG. 2, according to one or more embodiments of the present invention. AMD 100 further includes a fan system 102, an inlet 112, an outlet 114, one or more focal-bearing surface(s) 120 that has an associated focal point, and one or more noise dampening structure(s) 140 at each focal point of the respective focal-bearing surface 120. The fan system 102 may include one or more fan blade(s) 106 that extend from a central fan hub 104.

The fan system 102 induces or generates airflow 130 from the inlet 112 through the AMD housing 110 against the one or more focal-bearing surface(s) 120 to the outlet 114. The fan system 102 may induce or generate airflow 130 by rotating the fan blade(s) 106 and central fan hub 104 system together around axis of rotation 108, exemplarily depicted in FIG. 6 and in FIG. 10. Without the AMD housing 110, the fan system 102 induces or generates a normal airflow 130 in a general flow-path largely in the negative x-axis direction. This normal airflow 130 is caused by the fan blade(s) 106 pushing air from the fan system 102 on the associated push-side of the fan system 102 and pulling in new air on the opposing pull-side of the fan system 102. This normal airflow 130 may have an airflow bisector or vector that is parallel with the axis of rotation 108.

When incorporated into the AMD housing 110, the fan system 102 may induce or generate airflow 130 in a multi-direction, < shaped direction, S-shaped direction, Z-shaped direction, or the like, from the inlet 112, against the one or more focal-bearing surface(s) 120, and through the outlet 114, as is depicted. This multi-direction airflow 130 is caused by the fan blade(s) 106 pushing air from the fan system 102 on one side of the fan system 102 and forcing that air against focal-bearing surface 120.1 changing the direction of the airflow 130 generally toward the outlet 114. As the focal-bearing surface 120.1 is located downstream of the airflow 130 relative to a reference location of the fan system 102, such as the blade(s) 106, focal-bearing surface 120.1 may be referred to herein as the downstream focal-bearing surface 120.

New air is pulled in from inlet 112 and may be further forced against focal-bearing surface 120.2, changing the direction of the airflow 130 generally toward the fan system 102. As the focal-bearing surface 120.2 is located upstream of the airflow 130, relative to the reference location of the fan system 102, focal-bearing surface 120.2 may be referred to herein as the upstream focal-bearing surface 120.

In an embodiment of the present invention, as depicted, the outlet 114 may be located by a dimension "a" from the pull-side of fan system 102. This dimension "a" locates the outlet 114 relatively away from focal-bearing surface 120.1 to achieve an appropriate or adequate airflow 130 path length so that the airflow 130 path may change direction against focal-bearing surface 120.1 toward outlet 114. Dimension "a" may be sufficiently large to allow for airflow 130 to exit fan system 102, change direction at a generally acute angle as influenced by focal-bearing surface 120.1 to turn back toward the fan system 102, pass by the fan system 102, and exit at outlet 114.

In an embodiment of the present invention, as depicted, the inlet 112 may be located by a dimension "b" from the push-side of fan system 102. This dimension "b" similarly locates the inlet 112 relatively away from focal-bearing surface 120.2 to achieve an appropriate or adequate airflow 130 path length so that the airflow 130 path may change direction against focal-bearing surface 120.2 toward fan system 102. Dimension "b" may be sufficiently large to allow for airflow 130 to enter inlet 112, pass by the fan system 102, and change direction at a generally acute angle as influenced by focal-bearing surface 120.2, and turn back toward the fan system 102.

Focal-bearing surface 120.1 is an internal AMD housing surface that redirects fan system 102 push-side airflow 130. Focal-bearing surface 120.1 may be any geometrical surface that includes one focal point, such as a spherical surface, parabolic surface, or the like. Similarly, focal-bearing surface 120.2 is an internal AMD housing surface that redirects fan system 102 pull-side airflow 130. Focal-bearing surface 120.2 may be any geometrical surface that includes one focal point, such as a spherical surface, parabolic surface, or the like. Focal-bearing surface 120.1 is depicted as the same geometrical surface relative to focal-bearing surface 120.2. However, focal-bearing surface 120.1 may be a different geometrical surface relative to focal-bearing surface 120.2. For example, focal-bearing surface 120.1 may be a spherical surface and focal-bearing surface 120.2 may be a parabolic surface.

In an embodiment, the outlet 114 is positioned in relation to the focal-bearing surface 120.1 to direct the airflow 130 efficiently or geometrically therefrom towards the outlet 114. Similarly, the inlet 112 may be positioned in relation to the focal-bearing surface 120.2 to direct the airflow 130 efficiently or geometrically therefrom towards the fan system 102.

Figure 3:
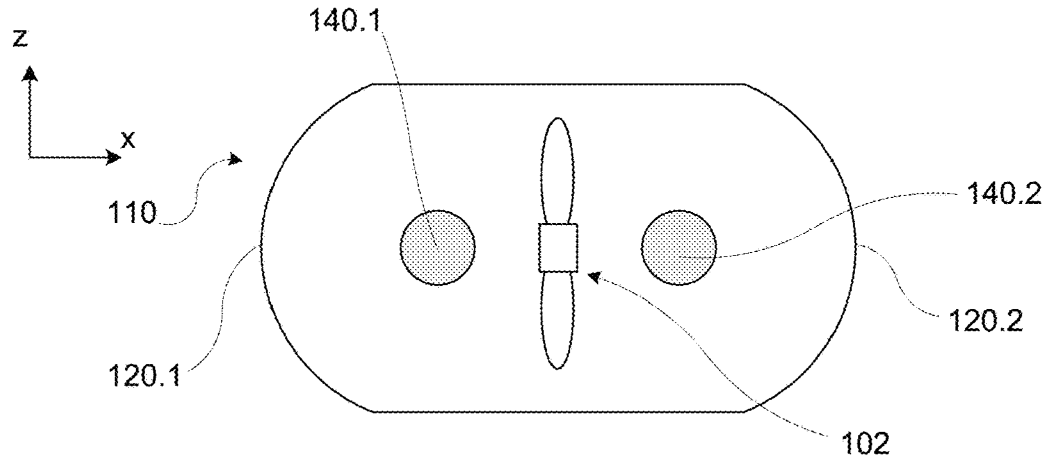

Referring to FIG. 2 and FIG. 3 together, FIG. 2 depicts a x-y planar cross-section view and FIG. 3 depicts an x-z planar cross-section view of AMD 100 that includes an AMD housing 110 that routes airflow 130 and that dampens acoustic noise 150, according to one or more embodiments of the present invention.

As a byproduct of moving air, or generating airflow 130, AMD 100 also generates noise 150. Some noise 150 results from pushed air leaving the fan system 102 with some noise 150 generated from new air sucked into fan system 102 to replace it. In accordance with embodiments, focal-bearing surface 120 and noise dampening structure 140 may be utilized to reduce noise exiting AMD 100.

Focal-bearing surface 120.1 further reflects and concentrates noise 150 to its associated focal point. Similarly, focal-bearing surface 120.2 reflects and concentrates noise 150 to its associated focal point.

To achieve noise reduction, AMD housing 110 further includes one or more noise dampening structure(s) 140 at each focal point(s) to reduce, absorb, and/or dampen the concentrated noise. Noise dampening structure(s) 140 may be a structure, device, system, or the like that reduces noise or sound energy. Noise dampening structure(s) 140 may be a passive noise absorber such as foam, gel, rubber, or the like, or may be an active noise absorber or canceling system or component, such as an inverse sound wave noise canceling device, microphone, speaker, or the like.

Because noise 150 is concentrated within the AMD housing 110, a relatively smaller size noise dampening structure

140 may effectively or adequately reduce or dampen the noise generated by fan system 102. The smaller size noise dampening structure provides for relatively reduced airflow impedance, leading to a relatively increased airflow 130 through the AMD housing 110. As such, the embodiments may provide for both reduced AMD noise 150 and relatively increased airflow 130 therein and/or therefrom.

Noise dampening structure 140.1 may be located at the focal point of focal-bearing surface 120.1 and noise dampening structure 140.2 may be located at the focal point of focal-bearing surface 120.2. In a particular implementation, a center of noise dampening structure 140.1 is coincident with the focal point of focal-bearing surface 120.1, a center of noise dampening structure 140.2 is coincident with the focal point of focal-bearing surface 120.2, or the like. As used herein, the "center" is understood to be a volumetric center point of an associated three-dimensional structure, material, or the like.

Noise dampening structure 140.1 is depicted as the same structure, size, etc., relative to noise dampening structure 140.2. However, noise dampening structure 140.1 may be a different size, be a different structure or device, etc. relative to noise dampening structure 140.2. In one implementation, as depicted in FIG. 2 and FIG. 3, noise dampening structure 140.1 and 140.2 may each be a sphere of noise absorbing material of equal diameter. In another implementation, noise dampening structure 140.1 may have a relatively larger diameter. As the noise 150 energy may be greater on the push-side of fan system 102, the noise dampening structure 140.1 may be a larger size, or a structure or device that absorbs, dampens, and/or reduces a relatively larger amount of noise 150, compared to noise dampening structure 140.2 on the pull-side of fan system 102.

Figure 4:
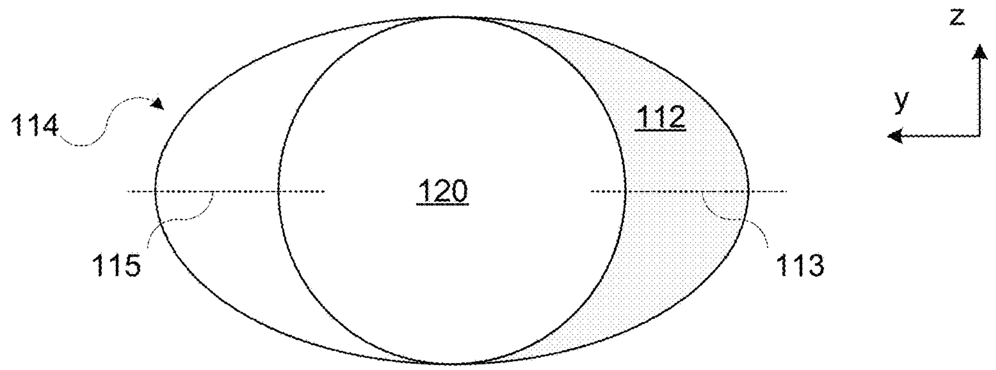
FIG. 4 and FIG. 5 each depict a normal view of an AMD housing that routes airflow and that dampens acoustic noise, according to one or more embodiments of the present invention.
Figure 5:
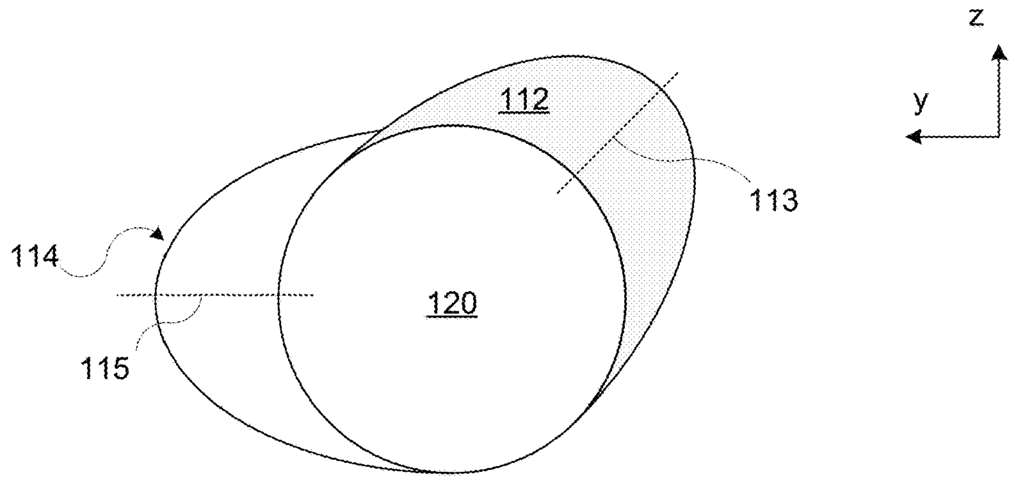

Referring to FIG. 4 and FIG. 5 together, FIG. 4 and FIG. 5 each depict a normal y-z planar view of AMD housing 110, according to one or more embodiments of the present invention. Inlet 112 may have a x-y planar bisector 113 and outlet 114 may have a x-y planar bisector 115. As shown in FIG. 4, planar bisector 113 and planar bisector 115 may be coplanar. Therefore, in an implementation depicted in FIG. 4, an overall airflow 130 bisector or vector through AMD housing 110 may be coplanar with planar bisector 113 and planar bisector 115.

As shown in FIG. 5, planar bisector 113 and planar bisector 115 may lay on different planes at an obtuse angle, or the like, relative to one another. In a different implementation, planar bisector 113 and planar bisector 115 may lay on orthogonal planes relative to one another. For example, planar bisector 115 may lay on the x-y plane and planar bisector 113 may lay on the x-z plane. Therefore, in these implementations, an overall airflow 130 bisector or vector may lay within different planes through AMD housing 110.

Figure 6:
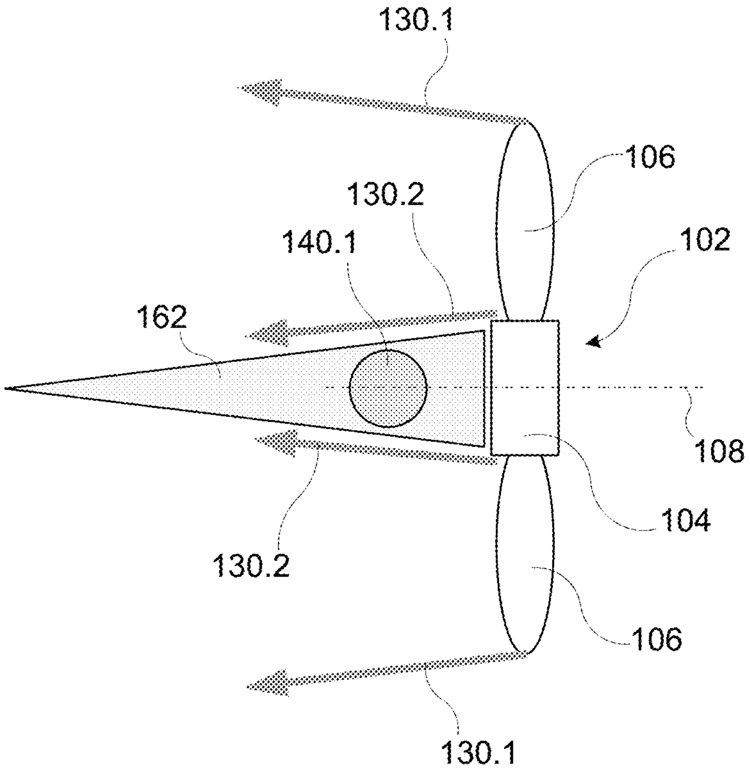
FIG. 6 and FIG. 7 depict exemplary acoustic noise dampening structure placement and size in relation to a fan within an AMD, according to one or more embodiments of the present invention.
Figure 7:
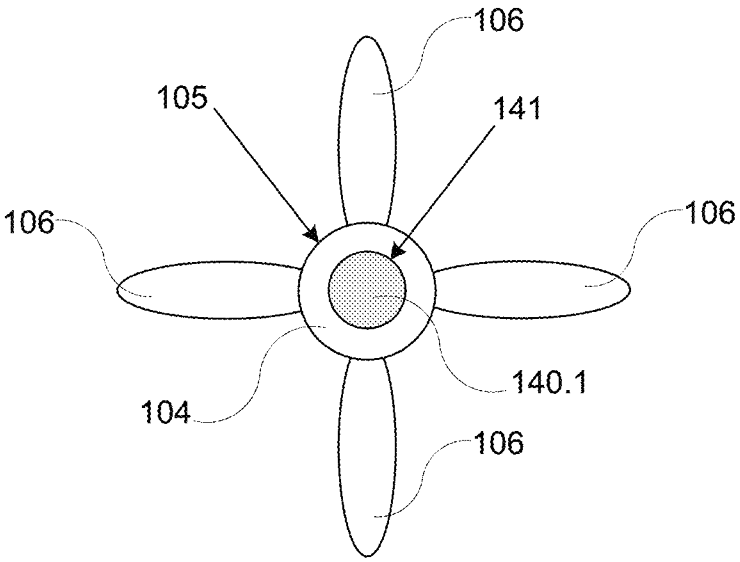

Referring to FIG. 6 and FIG. 7 together, FIG. 6 and FIG. 7 depict exemplary acoustic noise dampening structure 140.1 placement and size in relation to fan system 102, according to one or more embodiments of the present invention.

The fan system 102 may induce or generate airflow 130 by rotating the fan blade(s) 106 and central fan hub 104 system together around axis of rotation 108. Without the AMD housing 110, the fan system 102 induces or generates a normal airflow 130 in a general flow-path largely in the negative x-axis direction. This normal airflow 130 is caused by the fan blade(s) 106 pushing air from the fan system 102 on the associated push-side of the fan system 102 and pulling in new air on the opposing pull-side of the fan system 102. This normal airflow 130 may have an airflow bisector or vector that is parallel and/or coincident with the axis of rotation 108.

An outer perimeter of normal airflow 130 exiting the fan system 102 may have a conical shape, as depicted. An outer perimeter 130.1 of normal airflow 130 from the tips of the rotating blades 106 may have an outwardly expanding conical shape with reference to axis 108. An inner perimeter 130.2 of normal airflow 130 from the base of the rotating blades 106 may have an inwardly tapering conical shape with reference to axis 108. The inwardly tapering conical shape may result from the interrelationship between the hub 104 and the one or more blades 106. The outer perimeter 130.1 and inner perimeter 130.2 exiting the fan system 102 may alternatively be normal to the fan system, e.g., generally parallel with the axis of rotation.

The inwardly contracting conical shape of normal airflow 130 may form a low air pressure conical region 162. The low air pressure conical region 162 generally has a lower air pressure relative to the surrounding regions of normal airflow 130.

In an implementation, acoustic noise dampening structure 140.1 may be placed entirely within the low air pressure conical region 162 to minimize impedance of the higher air pressure surrounding regions of airflow 130. In such implementations, a diameter 105 of hub 104 may be larger than a diameter 141 of acoustic noise dampening structure 140.1, as is depicted in FIG. 7. Further, in an implementation depicted in FIG. 6, a center or other portion of acoustic noise dampening structure 140.1 may be coincident with the axis of rotation 108.

Figure 8:
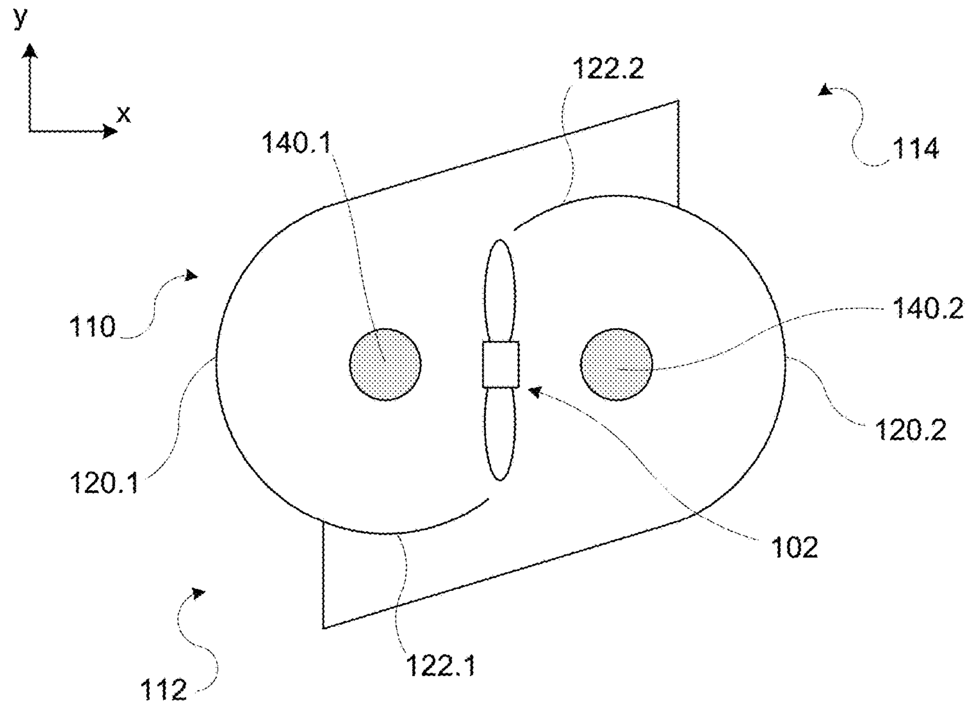
FIG. 8 depicts a cross-section view of an AMD housing that routes airflow and that dampens acoustic noise, according to one or more embodiments of the present invention.

FIG. 8 depicts a x-y planar cross-section view of AMD housing 110, according to one or more embodiments of the present invention. AMD housing 110 may further include internal recirculation surfaces 122 at least partially prevents airflow 130 recirculation. Airflow recirculation occurs when airflow exiting the fan system 102 from the push-side recirculates to the pull-side of fan system 102 without exiting the AMD housing 110. As recirculation surface 122 at least partially prevents recirculation, such recirculation surface 122 may further influence airflow 130 to achieve or otherwise provide for the < shaped, Z shaped, S shaped, airflow 130 path through AMD housing 110.

In the implementation depicted, recirculation surface 122.1 may be integral to focal-bearing surface 120.1 and may also be a focal-bearing surface that includes a shared focal point with focal-bearing surface 120.1. Similarly, recirculation surface 122.2 may be integral to focal-bearing surface 120.2 and may also be a focal-bearing surface that includes a shared focal point with focal-bearing surface 120.2. If recirculation surfaces 122.1, 122.2 do include a focal point, the focal point of each corresponding recirculation surface 122.1, 122.2 may be the same focal point as one of either focal point associated with focal-bearing surfaces 120.1, 120.2. For example, the focal point of recirculation surface 122.1 may be the same as the focal point of focal-bearing surface 120.2, the focal point of recirculation surface 122.2 may be the same as the focal point of focal-bearing surface 120.1, etc.

In other implementations, recirculation surface 122.1 and recirculation surface 122.2 may be a separate structure or separate surface, such as a baffle, non-focal-bearing surface, or the like relative to focal-bearing surface 120.1 or focal-bearing surface 120.2, respectively.

Figure 9:
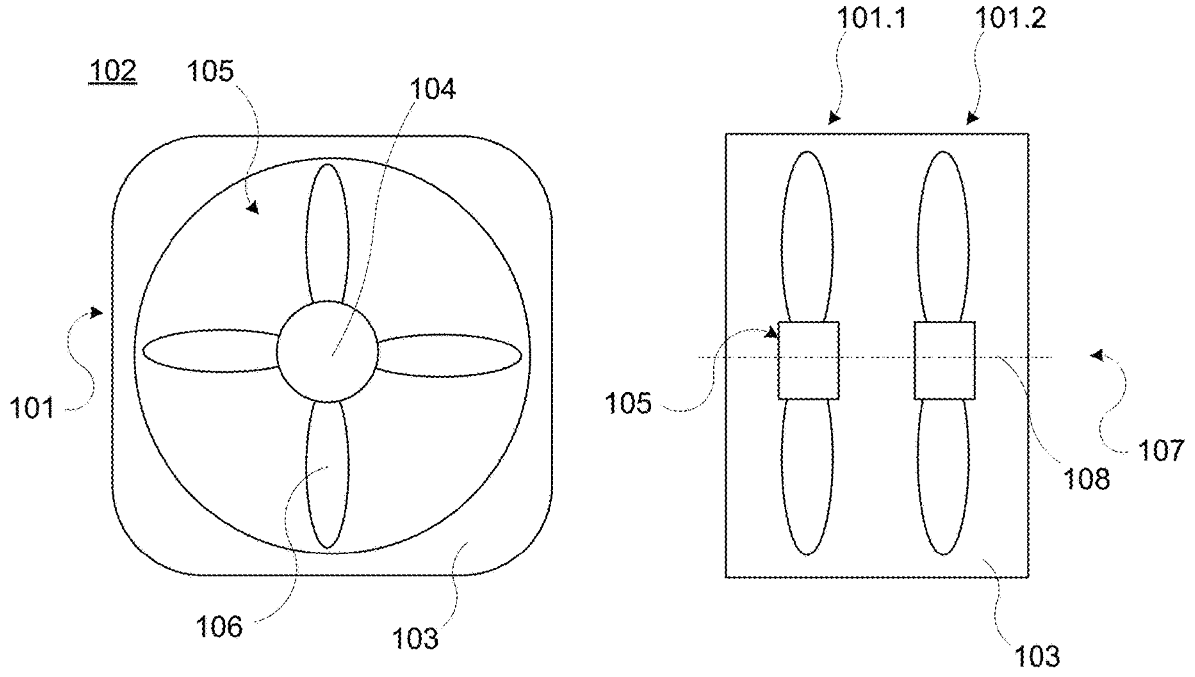
FIG. 9 depicts an exemplary AMD, according to one or more embodiments of the present invention.

FIG. 9 depicts an exemplary fan system 102, according to one or more embodiments of the present invention. Fan system 102 may further include a housing, a housing inlet 107, and a housing outlet 105. Housing inlet 107 and housing outlet 105 may generally be openings within housing. Fan system 102 may pull air from the housing inlet 107 (i.e., from the pull-side of fan system 102) and may push or expel air from the housing outlet 105 (i.e., from the push-side of fan system 102). The depicted fan system 102 includes a fan hub and blade assembly 101 that includes hub 104 and blades 106.

The exemplary fan system 102 may have multiple fan hub and blade assemblies 101. The different fan hub and blade assemblies 101 may be counterrotating fans. For example, fan hub and blade assembly 101.1 rotates about axis 108 in a clockwise direction and fan hub and blade assembly 101.2 rotates about axis 108 in a counterclockwise direction.

Figure 10:
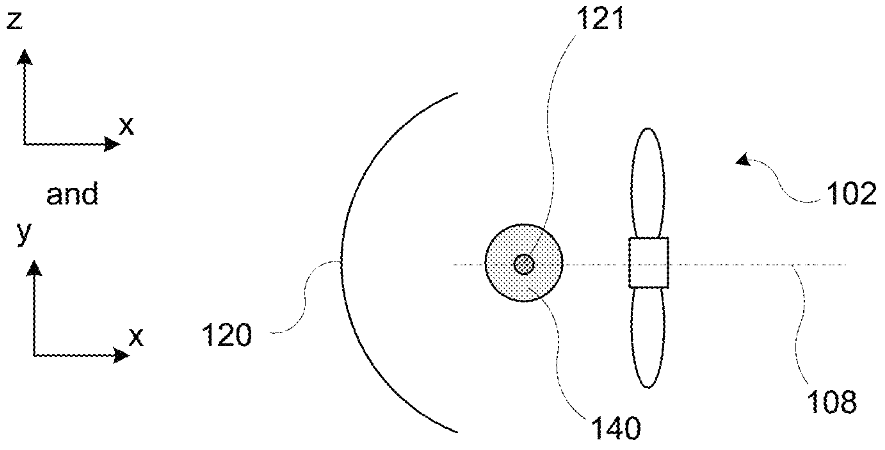
FIG. 10 depicts exemplary acoustic noise dampening structure placement in relation to a focal-bearing surface of the AMD housing that routes airflow, according to one or more embodiments of the present invention.

FIG. 10 depicts exemplary acoustic noise dampening structure placement in relation to focal-bearing surface 120, according to one or more embodiments of the present invention.

Focal-bearing surface 120 defines focal point 121. Focal-bearing surface 120 reflects and concentrates noise 150 to focal point 121. To achieve noise reduction, AMD housing 110 further includes one or more noise dampening structure(s) 140 located at focal point 121 to reduce, absorb, and/or dampen the concentrated noise 150. In a particular implementation, the center of noise dampening structure 140 is coincident with focal point 121. Further in a particular implementation, the center of noise dampening structure 140 is coincident with axis of rotation 108 of fan system 102.

Because noise 150 is concentrated within the AMD housing 110 at focal point 121, a relatively smaller size noise dampening structure 140 may effectively or adequately reduce or dampen the noise generated by fan system 102. The smaller size noise dampening structure provides for relatively reduced airflow impedance, leading to a relatively increased airflow 130 through the AMD housing 110.

Figure 11:
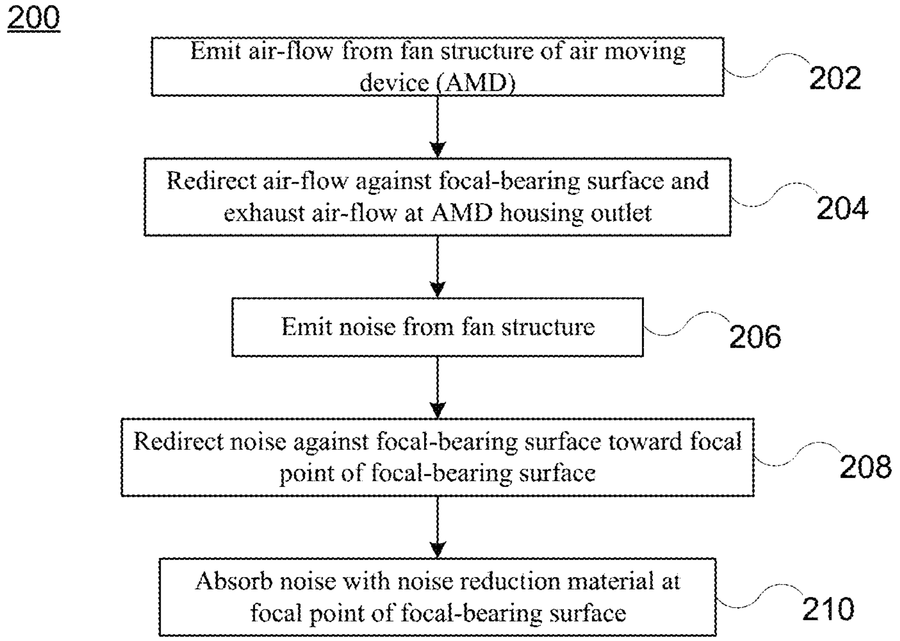
FIG. 11 depicts an exemplary method of routing airflow and dampening acoustic noise, according to one or more embodiments of the present invention.

FIG. 11 depicts an exemplary method 200 of routing airflow 130 and dampening acoustic noise 150, according to one or more embodiments of the present invention. At block 202, airflow 130 is emitted from fan system 102 of AMD 100. For example, airflow 130 is induced through AMD housing 110 from inlet 112 by fan system 102 pulling air from housing inlet 107 from the pull-side of fan system 102 and by fan system 102 pushing air from the housing outlet 105 from the push-side of fan system 102.

Method 200 may continue at block 204 with directing or impinging the airflow 130 against focal-bearing surface 120.1, thereby changing the direction or vector of airflow 130, and subsequently exhausting airflow 130 at outlet 114 of the AMD housing 110.

Method 200 may continue at block 206 with emitting noise 150 from the fan system 102. For example, a byproduct of moving air, or generating airflow 130, AMD 100 also generates noise 150. Some noise 150 results from pushed air leaving the fan system 102 with some noise 150 generated from new air sucked into fan system 102 to replace it.

Method 200 may continue at block 208 with redirecting or reflecting noise 150 against focal-bearing surface 120.1 toward focal point 121 associated therewith. Focal-bearing surface 120.1 further reflects and concentrates noise 150 to focal point 121.

Method 200 may continue at block 210 with absorbing or generally reducing noise 150 with noise dampening structure 140 that is at least partially located at focal point 121. Because noise 150 is concentrated within the AMD housing 110, a relatively smaller size noise dampening structure 140 may effectively or adequately reduce or dampen the noise generated by fan system 102. The smaller size noise dampening structure provides for relatively reduced airflow impedance, leading to a relatively increased airflow 130 through the AMD housing 110. As such, the embodiments may provide for both reduced AMD noise 150 and relatively increased airflow 130 therein and/or therefrom.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. Various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An air moving device comprising:
- a housing comprising an airflow inlet, an airflow outlet, a downstream focal-bearing surface, and an upstream focal-bearing surface;
- a fan system comprising a fan that rotates about an axis of rotation that emits noise as it impinges an airflow in a first direction away from the airflow outlet and against the downstream focal-bearing surface, wherein the downstream focal-bearing surface redirects the airflow in a second direction at an acute angle to the first direction toward the airflow outlet;
- a first noise dampening structure at a focal point of the downstream focal-bearing surface, wherein the downstream focal-bearing surface redirects and concentrates the noise at the focal point of the downstream focal-bearing surface, and wherein the first noise dampening structure reduces the concentrated noise; and
- a second noise dampening structure at a focal point of the upstream focal-bearing surface, wherein the upstream focal-bearing surface redirects and concentrates the noise at the focal point of the upstream focal-bearing surface, and wherein the second noise dampening structure reduces the concentrated noise
- wherein the first noise dampening structure and the second noise dampening structure are aligned with the axis of rotation.

2. The air moving device of claim 1, wherein the first noise dampening structure comprises a parabolic perimeter surface and is formed of a passive noise reduction material.

3. The air moving device of claim 2, wherein a center of the first noise dampening structure is coincident with the focal point of the downstream focal-bearing surface.

4. The air moving device of claim 1, wherein the first noise dampening structure is an active noise reduction device.

5. The air moving device of claim 1, wherein a planar bisector of the airflow inlet is coplanar with a planar bisector of the airflow outlet.

6. The air moving device of claim 1, wherein a planar bisector of the airflow inlet is obtusely angled with respect to a planar bisector of the airflow outlet.

7. The air moving device of claim 1, wherein first noise dampening structure is entirely located in a low air pressure region of the airflow emitted from the fan system.

8. The air moving device of claim 7, wherein a diameter of the first noise dampening structure is less than a diameter of a hub of the fan.

9. The air moving device of claim 1, wherein the airflow outlet is located from a pull-side of the fan system by a first x-axis dimension.

10. The air moving device of claim 1, wherein the airflow inlet is located from a push-side of the fan system by a second x-axis dimension.

11. The air moving device of claim 1, wherein the first noise dampening structure is a sphere of passive noise reduction material that includes a first diameter and wherein the second noise dampening structure is a sphere of passive noise reduction material that includes a second diameter smaller than the first diameter.

12. The air moving device of claim 1, wherein a center of the second noise dampening structure is coincident with the focal point of the upstream focal-bearing surface.

13. The air moving device of claim 1, wherein the downstream focal-bearing surface is a spherical surface.

14. The air moving device of claim 13, wherein the upstream focal-bearing surface is a spherical surface.

15. An air moving device comprising:
- a housing comprising an airflow inlet, an airflow outlet, a downstream focal-bearing surface, and an upstream focal-bearing surface;
- a fan system comprising a fan that rotates about an axis of rotation that emits noise as it impinges an airflow in a first direction away from the airflow outlet and against the downstream focal-bearing surface, wherein the downstream focal-bearing surface redirects the airflow in a second direction at an acute angle to the first direction toward the airflow outlet;
- a first noise dampening structure at a focal point of the downstream focal-bearing surface that is aligned with the axis of rotation, wherein the downstream focal-bearing surface redirects and concentrates the noise at the focal point of the downstream focal-bearing surface, and wherein the first noise dampening structure reduces the concentrated noise; and a second noise dampening structure at a focal point of the upstream focal-bearing surface that is also aligned with the axis of rotation, wherein the upstream focal-bearing surface redirects and concentrates the noise at the focal point of the upstream focal-bearing surface, and wherein the second noise dampening structure reduces the concentrated noise.

16. The air moving device of claim 15, wherein the first noise dampening structure comprises a parabolic perimeter surface and is formed of a passive noise reduction material.

17. The air moving device of claim 15, wherein the first noise dampening structure is an active noise reduction device.

18. The air moving device of claim 15, wherein a planar bisector of the airflow inlet is coplanar with a planar bisector of the airflow outlet.

19. The air moving device of claim 15, wherein a planar bisector of the airflow inlet is obtusely angled with respect to a planar bisector of the airflow outlet.

20. The air moving device of claim 15, wherein first noise dampening structure is entirely located in a low air pressure region of the airflow exiting the fan system.

* * * * *